(12) United States Patent
Fuse et al.

(10) Patent No.: US 8,173,746 B2
(45) Date of Patent: *May 8, 2012

(54) METHOD FOR PRODUCING OLEFINIC THERMOPLASTIC ELASTOMER

(75) Inventors: Kazuyoshi Fuse, Chiba (JP); Hironobu Shigematsu, Kobe (JP); Takeshi Tominaga, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 12/517,392

(22) PCT Filed: Dec. 19, 2007

(86) PCT No.: PCT/JP2007/075042
§ 371 (c)(1),
(2), (4) Date: Jul. 13, 2009

(87) PCT Pub. No.: WO2008/075782
PCT Pub. Date: Jun. 26, 2008

(65) Prior Publication Data
US 2010/0004400 A1    Jan. 7, 2010

(30) Foreign Application Priority Data

Dec. 21, 2006  (JP) .................... 2006-344190
Dec. 21, 2006  (JP) .................... 2006-344191

(51) Int. Cl.
*C08F 8/00*   (2006.01)
*C08J 3/00*   (2006.01)
*C08L 9/00*   (2006.01)
*C08L 23/00*  (2006.01)
*C08L 45/00*  (2006.01)

(52) U.S. Cl. ........ 525/191; 525/197; 525/211; 525/232; 525/240

(58) Field of Classification Search ................. 525/191, 525/197, 211, 232, 240
See application file for complete search history.

(56) References Cited

U.S. PATENT DOCUMENTS

| 6,111,021 A | 8/2000 | Nakahama et al. |
| 6,670,426 B2 * | 12/2003 | Kanae et al. ............... 525/329.5 |
| 7,030,190 B2 * | 4/2006 | Wakita et al. ............... 525/166 |
| 2006/0073351 A1 | 4/2006 | Natsuyama et al. |
| 2010/0010155 A1 * | 1/2010 | Fuse et al. ................. 524/581 |

FOREIGN PATENT DOCUMENTS

| CN | 1189845 A | 8/1998 |
| EP | 1 338 619 A1 | 8/2003 |
| EP | 1 605 015 A1 | 12/2005 |
| GB | 2 424 224 A | 9/2006 |
| JP | 2006-37115 A | 2/2006 |
| WO | 2007/145705 A1 | 12/2007 |

* cited by examiner

*Primary Examiner* — Nathan M Nutter
(74) *Attorney, Agent, or Firm* — Sughrue Mion, PLLC

(57) ABSTRACT

A method for producing an olefinic thermoplastic elastomer comprising mixing 100 parts by weight of an olefin copolymer rubber (A) obtained by polymerizing ethylene, an α-olefin having 3 to 20 carbon atoms and a non-conjugated polyene, and based on 100 parts by weight of the olefin copolymer rubber (A), 11 to 50 parts by weight of a volatile organic solvent (B) and 5 to 150 parts by weight of an olefin resin (C), and removing from the mixture the volatile organic solvent (B) while kneading in an extruder.

5 Claims, 2 Drawing Sheets

METHOD FOR PRODUCING OLEFINIC THERMOPLASTIC ELASTOMER

TECHNICAL FIELD

The present invention relates to a method for producing an olefinic thermoplastic elastomer.

BACKGROUND OF THE INVENTION

Thermoplastic elastomers do not require a vulcanization process and can be processed by a molding machine for processing an ordinary thermoplastic resin. These characteristics are being harnessed to use thermoplastic elastomers in a broad range of fields, including automobile parts, home electric appliances or other miscellaneous goods. Among thermoplastic elastomers, an olefinic thermoplastic elastomer obtained by kneading an olefin copolymer rubber obtained by polymerizing ethylene, an α-olefin having 3 to 20 carbon atoms and a non-conjugated polyene, with an olefin resin, is widely used as a material that is light weight, recyclable, chlorine-free and environmentally friendly.

Known production methods of olefinic thermoplastic elastomers include kneading an olefin copolymer rubber and an olefin resin in a closed mixer as exemplified by a Banbury mixer. However, because a batch kneader such as a Banbury mixer is used, this method suffers from the problem of having poor productivity and being inefficient.

A method known for resolving this problem is to knead the olefin copolymer rubber and olefin resin with a twin-screw extruder. For example, JP-A-2006-37115 describes a method for producing a rubber composition in which a rubber mixture comprising 100 parts by weight of an olefin copolymer rubber and 3 to 10 parts by weight of a volatile organic solvent are charged into an extruder from the supply port of a multistage vented extruder; a polyolefin resin is charged into the extruder from another supply port under an inert gas atmosphere; the rubber mixture and the polyolefin resin are kneaded; and the solvent is removed.

SUMMARY OF THE INVENTION

However, if an olefin copolymer rubber, a volatile organic solvent and an olefin resin are kneaded by an extruder in the above-described ratios, a great deal of heat is generated in the extruder, whereby the olefin copolymer rubber is degraded.

An object of the present invention is to provide a method for efficiently producing an olefinic thermoplastic elastomer while suppressing deterioration in the olefin copolymer rubber by suppressing heat generation during the production process.

Specifically, the present invention is a method for producing an olefinic thermoplastic elastomer, including mixing 100 parts by weight of an olefin copolymer rubber (A) obtained by polymerizing ethylene, an α-olefin having 3 to 20 carbon atoms and a non-conjugated polyene, and based on 100 parts by weight of the olefin copolymer rubber (A), 11 to 50 parts by weight of a volatile organic solvent (B), 5 to 150 parts by weight of an olefin resin (C) and, optionally, 1 to 300 parts by weight of a mineral oil softener (D) to obtain a mixture; and removing the volatile organic solvent from the mixture (B) while kneading the mixture in an extruder.

According to the method for producing the olefinic thermoplastic elastomer of the present invention, an olefinic thermoplastic elastomer can be efficiently produced while suppressing deterioration in the olefin copolymer rubber by suppressing heat generation during the production process.

BRIEF DESCRIPTION OF THE DRAWINGS

In FIGS. 1 to 4, the reference numerals are as follows.

Figure 1:
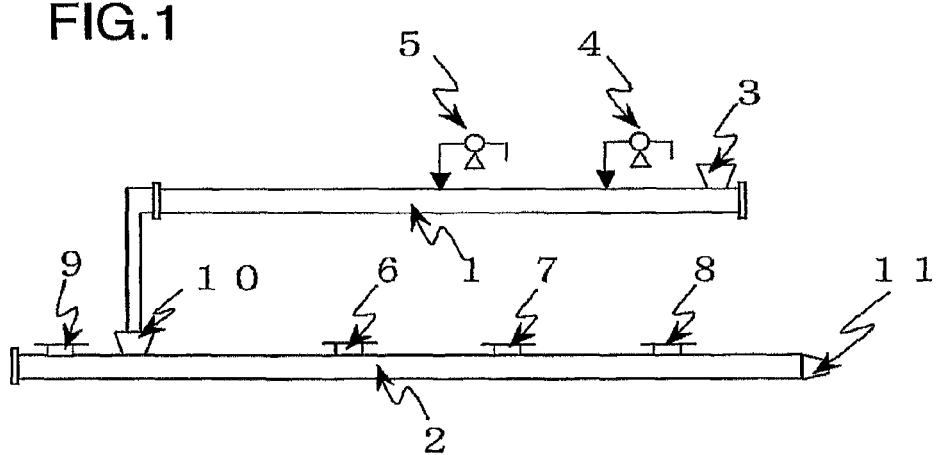
FIG. 1 is a schematic view of the vented twin-screw extruder used in the Examples and Comparative Examples of the present invention.

| | |
|---|---|
| 1: | First extruder |
| 2: | Second extruder |
| 3: | Supply port |
| 4: | Supply pump |
| 5: | Supply pump (for the mineral oil softener (D)) |
| 6: | Vent |
| 7: | Vent |
| 8: | Vent |
| 9: | Vent |
| 10: | Supply port |
| 11: | Second extruder resin temperature measurement position |
| 12: | Olefin copolymer rubber polymerization tank |
| 13: | Extruder |
| 14: | Supply pump |
| 15: | Olefin resin (C) supply port |
| 16: | Vent |
| 17: | Vent |
| 18: | Vent |
| 19: | Olefin copolymer rubber polymerization tank |
| 20: | First extruder |
| 21: | Second extruder |
| 22: | Supply pump |
| 23: | Olefin resin (C) supply port |
| 24: | Vent |
| 25: | Vent |
| 26: | Vent |

BEST MODE FOR CARRYING OUT THE INVENTION

In the present invention, an olefin copolymer rubber (A) is used, which is obtained by polymerizing ethylene, an α-olefin having 3 to 20 carbon atoms and a non-conjugated polyene. The "olefin copolymer rubber (A)" in the present invention is an ethylene/α-olefin/non-conjugated polyene copolymer rubber having an A hardness according to JIS K-6253 of 98 or less.

In the following, the term "ethylene unit" refers to the monomer-derived constitutional units present in the rubber, obtained by polymerization or in a resin.

Examples of the α-olefin having 3 to 20 carbon atoms can include propylene, 1-butene, 2-methylpropylene, 1-pentene, 3-methyl-1-butene, 1-hexene, 4-methyl-1-heptene and 1-octene, as well as a combination of two or more thereof. Among these examples, in view of availability propylene or 1-butene is preferred, and propylene is more preferred.

Examples of the non-conjugated polyene can include a chain non-conjugated diene such as 1,4-hexadiene, 1,6-octadiene, 2-methyl-1,5-hexadiene, 6-methyl-1,5-heptadiene and 7-methyl-1,6-octadiene; a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and a triene such as 2,3-diisopropylidene-5-norbornene, 2-ethylidene-3-isopropylidene-5-norbornene, 2-propenyl-2,2-norbornadiene and 4-ethylidene-8-methyl-1,7-nanodiene. Among these examples, preferred is 5-ethylidene-2-norbornene or dicyclopentadiene.

If the total of the ethylene units, α-olefin units having 3 to 20 carbon atoms and non-conjugated polyene units contained in the olefin copolymer rubber (A) is 100% by weight, then the amount of ethylene units contained in the olefin copolymer rubber (A) is normally 30 to 90% by weight, and preferably, 40 to 80% by weight; the amount of α-olefin units having 3 to 20 carbon atoms is normally 5 to 70% by weight, and preferably, 15 to 60% by weight; and the amount of non-conjugated polyene units is normally 0.1 to 30% by weight, and preferably, 0.1 to 20% by weight (the total of these three types of monomer units is 100% by weight). Specific examples of the olefin copolymer rubber (A) include ethylene/propylene/5-ethylidene-2-norbornene copolymer, ethylene/propylene/dicyclopentadiene copolymer, ethylene/propylene/1,4-hexadiene copolymer and ethylene/propylene/5-vinyl-2-norbornene copolymer, as well as combinations of two or more thereof. Among these examples, preferred is an ethylene/propylene/5-ethylidene-2-norbornene copolymer having an ethylene unit content of 40 to 80% weight, a propylene unit content of 15 to 551 by weight and a 5-ethylidene-2-norbornene unit content of 2 to 101 by weight.

The olefin copolymer rubber (A) can be obtained by a known polymerizing process. Examples of the polymerization method include polymerizing in an inert solvent, such as hexane, heptane, toluene and xylene, using a polymerization catalyst such as a Ziegler-Natta catalyst or a metallocene catalyst.

The Mooney viscosity ($ML_{1+4}$ 100° C.) of the olefin copolymer rubber (A) is preferably 10 to 350, and more preferably 30 to 300. An olefinic thermoplastic elastomer obtained using an olefin copolymer rubber (A) having a Mooney viscosity within this range has excellent mechanical strength when molded, and can provide a molded article having an extremely good appearance.

Specific examples of the volatile organic solvent (B) used in the present invention include aliphatic hydrocarbons, such as pentane, hexane, heptane, octane, decane, dodecane and kerosene, as well as halogen derivatives thereof; alicyclic hydrocarbons such as cyclohexane, methylcyclopentane and methylcyclohexane, as well as halogen derivatives thereof; and aromatic hydrocarbons such as benzene, toluene and xylene, as well as halogen derivatives thereof such as chlorobenzene. These solvents may be used alone or in combination. The volatile organic solvent (B) can be the solvent used for polymerizing the olefin copolymer rubber (A) by solution polymerization. Further, the volatile organic solvent (B) can include the monomer used for polymerizing the olefin copolymer rubber (A).

The olefin resin (C) in the present invention is a resin obtained by polymerization of ethylene and/or an α-olefin. Specific examples include an ethylene resin containing 70% by weight or more of ethylene units and a propylene resin containing 50% by weight or more of propylene units.

Examples of the propylene resin used for olefin resin (C) in the present invention include a propylene homopolymer containing 50 to 100% by weight, and preferably 80 to 100% by weight, of propylene units, and a random copolymer or block copolymer of propylene, ethylene and/or an α-olefin having 4 to 10 carbon atoms (for example, 1-butene, 1-hexene, 1-pentene, 1-octene and 4-methyl-1-pentene). Examples of such copolymer can include ethylene/propylene copolymer, propylene/1-butene copolymer, propylene/1-hexene copolymer, propylene/1-octene copolymer, propylene/ethylene/1-butene copolymer and ethylene/propylene/1-hexene copolymer. As the olefin resin (C), a propylene homopolymer, ethylene/propylene copolymer or propylene/1-butene copolymer are preferably used.

The term "block copolymer" described above means, for the case of using propylene and ethylene, a polymer produced by a production method comprising the following steps.

(1) Producing polypropylene by homopolymerizing propylene; and
(2) Copolymerizing propylene and ethylene in the presence of the polypropylene; or
(1) Producing polypropylene by homopolymerizing propylene; and
(2) Removing unreacted propylene monomer and, in the presence of the polypropylene, adding ethylene and polymerizing the resultant product.

In the former case, the obtained polymer is essentially a mixture of the polypropylene produced in step (1) and the propylene/ethylene copolymer produced in step (2).

If the olefin resin (C) used in the present invention is a propylene resin, this propylene resin preferably has a melt flow rate of 0.1 to 300 g/10 minutes, and more preferably 0.5 to 200 g/10 minutes, measured according to JIS K6758 at a temperature of 230° C. under a load of 21.18 N.

Examples of the ethylene resin used for the olefin resin (C) in the present invention include: (1) an ethylene homopolymer containing 70 to 100% by weight of ethylene units; and (2) a copolymer of ethylene, an α-olefin having 3 to 10 carbon atoms (for example, propylene, 1-butene, 1-pentene, 4-methyl-1-pentene and 1-hexene) and/or a monomer having a polar group and a carbon-carbon double bond (for example, vinyl acetate, acrylates and methacrylates) containing 70 to 100% by weight of ethylene units. Preferred ethylene resins include high-density polyethylene, low-density polyethylene, ethylene/propylene copolymer, ethylene/1-butene copolymer, ethylene/1-pentene copolymer, ethylene/4-methyl-1-pentene copolymer and ethylene/1-hexene copolymer.

If the olefin resin (C) used in the present invention is an ethylene resin, this ethylene resin preferably has a melt flow rate of 0.01 to 300 g/10 minutes, and more preferably 0.1 to 200 g/10 minutes, measured according to JIS K6760 at a temperature of 190° C. under a load of 21.18 N.

The olefin resin (C) used in the present invention can be obtained by a known polymerizing process. Examples of the polymerization method can include (1) polymerizing in an inert solvent such as hexane, heptane, toluene and xylene; (2) polymerizing a liquid monomer(s) (bulk polymerization); (3) polymerizing a gaseous monomer(s) (gas-phase polymerization); and (4) a combination of these methods, each of which methods uses a polymerization catalyst such as a Ziegler-Natta catalyst or a metallocene catalyst. The olefin resin (C) is not particularly limited in its steric structure. Examples of the steric structure can include an isotactic structure, a syndiotactic structure and a combination thereof. Of these, preferred is a propylene resin which is mainly isotactic structure.

Examples of the mineral oil softener (D) which is optionally used in the present invention can include a high-boiling point fraction of petroleum, which fraction has an average molecular weight of 300 to 1,500 and a fluid point of 0° C. or lower, such as an aromatic mineral oil, a naphthenic mineral oil and a paraffinic mineral oil. Among them, preferred is a paraffinic mineral oil. The mineral oil softener (D) can be contained in advance in the olefin copolymer rubber. In the rubber industry, an olefin copolymer rubber which contains a mineral oil softener is typically called oil-extended rubber and the mineral oil softener is called an extender oil.

Examples of methods for obtaining an olefin copolymer rubber containing a mineral oil softener can include: (1) kneading mechanically both components with a kneading apparatus such as a roll or a Banbury mixer; and (2) adding the mineral oil softener to a solution of the olefin copolymer rubber obtained in the production step of the olefin copolymer rubber (A), and then removing the solvent by a method such as steam stripping.

The present invention is a method for producing an olefinic thermoplastic elastomer including mixing 100 parts by weight of the above-described olefin copolymer rubber (A), and based on 100 parts by weight of the olefin copolymer rubber (A), 11 to 50 parts by weight of a volatile organic solvent (B), 5 to 150 parts by weight of an olefin resin (C) and, optionally, 1 to 300 parts by weight of a mineral oil softener (D), and removing from the mixture the volatile organic solvent (B) while kneading in an extruder. By kneading with an extruder the olefin copolymer rubber (A), volatile organic solvent (B), olefin resin (C) and, optionally, a mineral oil softener (D), an olefinic thermoplastic elastomer can be produced while suppressing deterioration in the olefin copolymer rubber by suppressing heat generation during the production process. The ratio of volatile organic solvent (B) to 100 parts by weight of olefin copolymer rubber (A) is preferably 15 parts by weight or more, and more preferably 20 parts by weight or more. The ratio of olefin resin (C) to 100 parts by weight of olefin copolymer rubber (A) is preferably 10 to 140 parts by weight, and more preferably 15 to 120 parts by weight or more. If the mineral oil softener (D) is used, the ratio of mineral oil softener (D) to 100 parts by weight of olefin copolymer rubber (A) is, in view of the balance between flexibility and adherence in the obtained olefinic thermoplastic elastomer, preferably 5 to 200 parts by weight.

In the present invention, components other than the olefin copolymer rubber (A), volatile organic solvent (B), olefin resin (C) and mineral oil softener (D), may be concomitantly used, for example, an inorganic filler such as talc and calcium carbonate; an additive such as a flame retardant, a plasticizer, an antistatic agent, a heat stabilizer, a light stabilizer, an antioxidant and a mold release agent; or a pigment.

These components may be blended into the olefin copolymer rubber (A) or olefin resin (C), or may be added separately during the kneading by the extruder of the olefin copolymer rubber (A), volatile organic solvent (B), olefin resin (C) and mineral oil softener (D).

The extruder used in the present invention may be a single apparatus, or may be a plurality of extruders coupled together. The extruder used during the kneading of the olefin copolymer rubber (A), volatile organic solvent (B), olefin resin (C) and, optionally, mineral oil softener (D), must be a vented extruder having one or more vents, and preferably two or more vents, for removing the volatile organic solvent (B). Further, the extruder used during the kneading of the olefin copolymer rubber (A), volatile organic solvent (B), olefin resin (C) and, optionally, mineral oil softener (D), is preferably a twin-screw extruder. The twin-screw extruder may be an extruder whose two screws rotate in the same direction, an extruder whose two screws rotate in opposite directions or an extruder having two screws completely or partially engage with each other or do not engage with each other. However, of these, preferred is an extruder having two screws rotate in the same direction, and which completely or partially engage with each other.

In the present invention, it is not necessary for the olefin copolymer rubber (A), volatile organic solvent (B), olefin resin (C) and, optionally, mineral oil softener (D), to be supplied simultaneously to the extruder. However, during the kneading of these components in the extruder, the ratio must be 100 parts by weight of the olefin copolymer rubber (A) and, based on 100 parts by weight of the olefin copolymer rubber (A), 11 to 50 parts by weight of the volatile organic solvent (B), 5 to 150 parts by weight of the olefin resin (C) and, if any, 1 to 300 parts by weight of the mineral oil softener (D). By removing the volatile organic solvent (B) from a vent in the extruder while kneading a mixture having this ratio, an olefinic thermoplastic elastomer can be efficiently produced while suppressing deterioration in the olefin copolymer rubber by suppressing heat generation.

Figure 2:
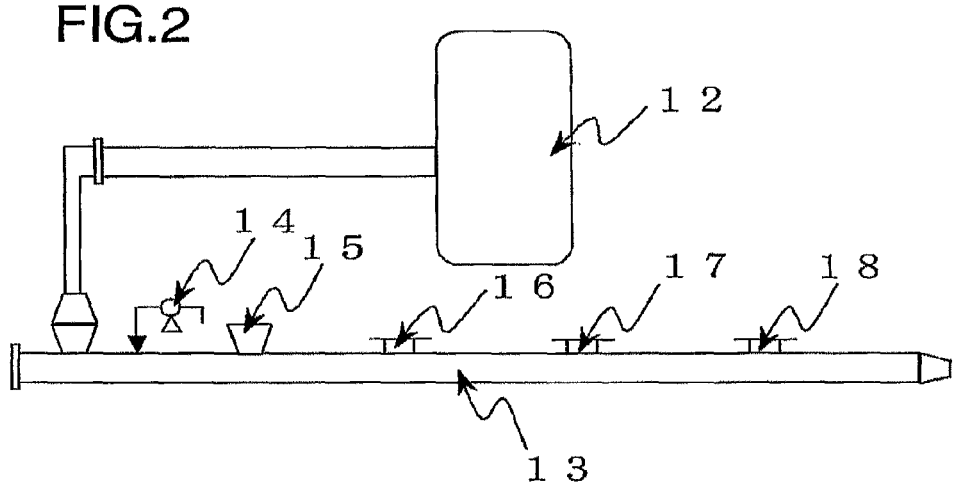
FIG. 2 is a schematic view of another extruder used in the present invention.

Examples of methods for producing an olefinic thermoplastic elastomer using one extruder include: supplying the olefin copolymer rubber (A), volatile organic solvent (B), olefin resin (C) and, optionally, mineral oil softener (D), to the extruder from one supply port, and while kneading the mixture, removing the volatile organic solvent (B) from a vent; and using a vented extruder having a plurality of supply ports, supplying the olefin copolymer rubber (A), volatile organic solvent (B) and, optionally, mineral oil softener (D) to the extruder from an upstream supply port and the olefin resin (C) from a downstream port, and while kneading the mixture, removing the volatile organic solvent (B) from a vent. The olefin resin (C) can be divided up and supplied from two or more supply ports. As illustrated in FIG. 2, in the latter-described method, a dispersion solution formed by dispersing the olefin copolymer rubber (A) polymerized in a polymerization tank (12) in a polymerization solvent may be adjusted so as to contain 11 to 50 parts by weight of polymerization solvent to 100 parts by weight of olefin copolymer rubber (A), and then directly supplied to an extruder (13) and the mineral oil softener (D), optionally, and the olefin resin (C) may also be supplied to the extruder (13). In this case, the polymerization solution acts as the volatile organic solvent (B). While kneading these components in the extruder (13), the volatile organic solvent (B) is removed from vents (16), (17) and (18), whereby the elastomer can be obtained.

An example of a method for producing an olefinic thermoplastic elastomer using two extruders is to supply the olefin copolymer rubber (A) and volatile organic solvent (B) to a first extruder, while kneading the mixture supply it to a second extruder coupled to the first extruder, supply the mineral oil softener (D), optionally, and olefin resin (C) to the second extruder, and while kneading the mixture, remove the volatile organic solvent (B) from a vent. The mineral oil softener (D) can also be supplied to the first extruder. In the case of using two extruders coupled together, a ventless extruder is used for the first extruder. For the second extruder, a vented extruder having a vent downstream from the olefin resin (C) supply port is used. Thus, even when using two extruders, the dispersion solution in which the olefin copolymer rubber (A) polymerized in the polymerization tank is dispersed in a polymerization solvent may be adjusted so that the ratio of polymerization solvent to olefin copolymer rubber (A) is 11 to 50 parts by weight of polymerization solvent to 100 parts by weight of olefin copolymer rubber (A), and then directly supplied to the first extruder.

In the case of using three extruders to produce the olefinic thermoplastic elastomer, an extruder is used having first and second extruders each coupled to a third extruder. The olefin copolymer rubber (A), volatile organic solvent (B) and, optionally, mineral oil softener (D) are supplied to the first extruder. The olefin resin (C) is supplied to the second extruder. The olefinic thermoplastic elastomer can be obtained by merging the resultant mixtures in the third extruder, and while kneading this mixture, removing the volatile organic solvent (B) from a vent. In this case, a ventless extruder is used for the first extruder and a vented extruder is used for the third extruder. The second extruder may or may not have a vent. Thus, even when using three extruders, the dispersion solution in which the olefin copolymer rubber (A) is dispersed in a polymerization solvent polymerized in the polymerization tank may be adjusted so that the ratio of polymerization solvent to olefin copolymer rubber (A) is 11 to 50 parts by weight of polymerization solvent to 100 parts by weight of olefin copolymer rubber (A), and then directly supplied to the first extruder.

Figure 3:
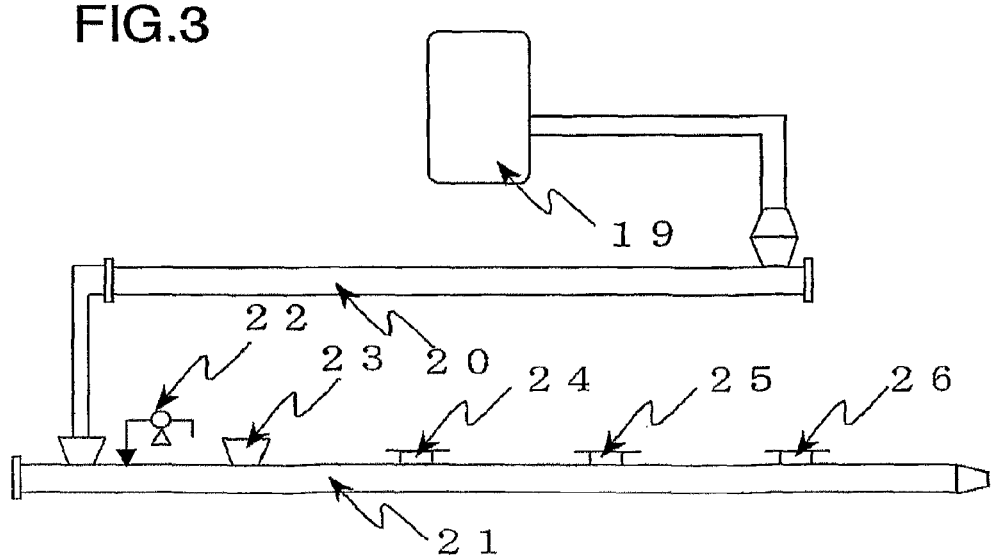
FIG. 3 is a schematic view of another extruder used in the present invention.

In the present invention, it is preferable to produce the olefinic thermoplastic elastomer using two extruders which are coupled together. The case of using two extruders will be described in detail using FIG. 3. FIG. 3 illustrates an apparatus in which a first extruder and a second extruder are coupled together. The olefin copolymer rubber (A) and volatile organic solvent (B) may be directly supplied from the olefin copolymer rubber polymerization tank (19) to the first extruder (20) via a not-shown concentration adjusting process. In the first extruder, the olefin copolymer rubber (A) and the volatile organic solvent (B) are kneaded. Then, this mixture is supplied to the second extruder (21), and is further kneaded along with, optionally, the mineral oil softener (D) supplied from the supply pump (22) and the olefin resin (C) supplied from the supply port (23). The volatile organic solvent (B) is removed from vents (24), (25) and (26), thereby allowing the olefinic thermoplastic elastomer to be obtained.

The olefinic thermoplastic elastomer produced by the production process according to the present invention can be used, for example, for automobile parts such as a bumper part, a roof molding, a side molding, a body panel, a side shield, a glass run channel, an instrument panel skin, a door skin, a ceiling skin, a weatherstrip material, a hose, and a steering wheel; electric components such as a wire covering, a connector, and a cap plug; footwear such as a shoe sole and sandals; leisure goods such as swim fins, swimming goggles, a golf club grip, and a baseball bat grip; and industrial goods such as a gasket, various gaskets and sheets for civil engineering and construction, a waterproof sheet, a garden hose, a belt, and industrial packing.

The present invention will now be described in more detail with reference to the following examples. However, the present invention is not limited to these examples.

(1) Raw Materials

As the olefin copolymer rubber (A), used was the veil-like Esprene 553 (manufactured by Sumitomo Chemical Co., Ltd.) ground with a grinder used for rubber (hereinafter, referred to as "EPDM-1"). The EPDM-1 was an ethylene/propylene/5-ethylidene-2-norbornene copolymer rubber having an ethylene unit content of 58.0% by weight, a propylene unit content of 37.5% by weight and a 5-ethylidene-2-norbornene unit content of 4.5% by weight.

As the olefin resin (C), used was Nobrene U501E1 (manufactured by Sumitomo Chemical Co., Ltd.) (hereinafter, referred to as "PP-1"). This PP-1 was a propylene homopolymer having a melting point of 160° C. and a melt flow rate of 130 g/10 minutes measured at 230° C. under a load of 21.18 N.

As the volatile organic solvent (B), used was a mixture solvent obtained by mixing hexane and 5-ethylidene-2-norbornene in a weight ratio of hexane:5-ethylidene-2-norbornene=15:1 (hereinafter, referred to as "mixed solvent").

As the mineral oil softener (D), used was PW-100 (manufactured by Idemitsu Kosan Co., Ltd.) (hereinafter, referred to as "softener"). This softener was a paraffinic mineral oil having an average molecular weight of 545 and a flow point of −12.5° C.

(2) Apparatus

An olefinic thermoplastic elastomer was produced using the apparatus illustrated in FIG. 1, in which a first extruder and a second extruder are coupled together. The first extruder was a twin-screw extruder having the product name "TEX65XCT" manufactured by The Japan Steel Works Ltd., with a cylinder inner diameter of 69 mm and a ratio (L/D) between cylinder length and cylinder inner diameter of 31.5. Further, a water pipe for cooling was provided on the inner side of the cylinder, and a heater for controlling the temperature was provided on the outer side of the cylinder. The second extruder was a twin-screw extruder having the product name "TEX30α" manufactured by The Japan Steel Works Ltd., with a cylinder inner diameter of 32 mm and a ratio (L/D) between cylinder length and cylinder inner diameter of 42. Further, a water pipe for cooling was provided on the inner side of the cylinder, and a heater for controlling the temperature was provided on the outer side of the cylinder.

Example 1

EPDM-1 and PP-1 were continuously supplied using a metered feeder respectively from a supply port (3) of the first extruder (1) at a supply rate of 20 kg/hr for the EPDM-1 and 8.6 kg/hr for the PP-1. Further, the mixed solvent was continuously supplied from a supply pump (4) on the first extruder at a supply rate of 4 kg/hr. The screw rotation speed of the first extruder (1) was set at 50 rpm, and the cylinder temperature was set at 130° C. At the first extruder (1), the EPDM-1, PP-1 and mixed solvent were mixed and continuously supplied to the second extruder (2) via a supply port (10). The screw rotation speed of the second extruder (2) was set at 300 rpm, and the cylinder temperature was set at 180° C. At the second extruder (2), the mixed solvent was removed from vent (6), vent (7), vent (8) and vent (9) while the EPDM-1, PP-1 and mixed solvent were kneaded. The kneaded product was cut by a pelletizer which was also provided in the second extruder to thereby obtain pellet-shaped olefinic thermoplastic elastomer. The temperature of the elastomer measured by a thermometer provided at position (11) of the second extruder is shown in Table 1.

Example 2

The same procedures were conducted as in Example 1, except that the supply rate of the mixed solvent was changed to 3 kg/hr. The results are shown in Table 1.

Example 3

The same procedures were conducted as in Example 1, except that the supply rate of PP-1 was changed to 2.2 kg/hr. The results are shown in Table 1.

Comparative Example 1

The same procedures were conducted as in Example 1, except that the supply rate of the mixed solvent was changed to 2 kg/hr. The results are shown in Table 1.

Comparative Example 2

The same procedures were conducted as in Example 1, except that the PP-1 was changed to 11 parts by weight and the supply rate of the mixed solvent was changed to 2 kg/hr. The results are shown in Table 1.

TABLE 1

|  | Example 1 | Example 2 | Example 3 | Comparative Example 1 | Comparative Example 2 |
|---|---|---|---|---|---|
| EPDM-1 (parts by weight) | 100 | 100 | 100 | 100 | 100 |
| Mixed solvent (parts by weight) | 20 | 15 | 20 | 10 | 10 |
| PP-1 (parts by weight) | 43 | 43 | 11 | 43 | 11 |
| Second extruder outlet temperature (° C.) | 229 | 230 | 268 | 235 | 271 |

Comparing Examples 1 and 2 with Comparative Example 1, it can be seen that Examples 1 and 2 had a lower second extruder outlet temperature. Therefore, it can be said that in Examples 1 and 2, deterioration of the olefin copolymer rubber (A) is suppressed. The same can also be seen from a comparison of Example 3 and Comparative Example 2.

Example 4

EPDM-1 and PP-1 were continuously supplied using a metered feeder respectively from a supply port (3) of the first extruder (1) at a supply rate of 20 kg/hr for the EPDM-1 and 8.6 kg/hr for the PP-1. Further, the mixed solvent was continuously supplied from a supply pump (4) on the first extruder at a supply rate of 4 kg/hr, and a softener was continuously supplied from a supply pump (5) at a supply rate of 6.8 kg/hr. The screw rotation speed of the first extruder (1) was set at 50 rpm, and the cylinder temperature was set at 130° C. At the first extruder (1), the EPDM-1, PP-1, mixed solvent and softener were mixed and continuously supplied to the second extruder (2) via a supply port (10). The screw rotation speed of the second extruder (2) was set at 300 rpm, and the cylinder temperature was set at 180° C. At the second extruder (2), the mixed solvent was removed from vent (6), vent (7), vent (8) and vent (9) while the EPDM-1, PP-1, mixed solvent and softener were kneaded. The kneaded product was cut by a pelletizer which was also provided in the second extruder to thereby obtain pellet-shaped olefinic thermoplastic elastomer. The temperature of the elastomer measured by a thermometer provided at position (11) of the second extruder is shown in Table 2.

Comparative Example 3

The same procedures were conducted as in Example 4, except that supply rate of the mixed solvent was changed to 2 kg/hr. The results are shown in Table 2.

TABLE 2

|  | Example 4 | Comparative Example 3 |
|---|---|---|
| EPDM-1 (parts by weight) | 100 | 100 |
| Mixed solvent (parts by weight) | 20 | 10 |
| PP-1 (parts by weight) | 43 | 43 |
| Softner (parts by weight) | 34 | 34 |
| Second extruder outlet temperature (° C.) | 215 | 219 |

(1) Raw Materials

As the olefin copolymer rubber (A), used was the veil-like Esprene 512P (manufactured by Sumitomo Chemical Co., Ltd.) ground with a grinder used for rubber (hereinafter, referred to as "EPDM-2"). The EPDM-2 was an ethylene/propylene/5-ethylidene-2-norbornene copolymer rubber having an ethylene unit content of 67.0% by weight, a propylene unit content of 32.6% by weight and a 5-ethylidene-2-norbornene unit content of 0.4% by weight.

As the olefin resin (C), used was Nobrene AU161C (manufactured by Sumitomo Chemical Co., Ltd.) (hereinafter, referred to as "PP-2"). This PP-2 was a propylene-based propylene/ethylene block copolymer having a melting point of 160° C. and a melt flow rate of 88 g/10 minutes measured at 230° C. under a load of 21.18 N.

Nobrene W531 (manufactured by Sumitomo Chemical Co., Ltd.) was used (hereinafter referred to as "PP-3"). This PP-3 was a propylene-based propylene/ethylene random copolymer having a melting point of 142° C. and a melt flow rate of 8 g/10 minutes measured at 230° C. under a load of 21.18N.

As the volatile organic solvent (B), used was a mixture solvent obtained by mixing hexane and 5-ethylidene-2-norbornene in a weight ratio of hexane:5-ethylidene-2-norbornene=15:1 (hereinafter, referred to as "mixed solvent").

(2) Apparatus

Figure 4:
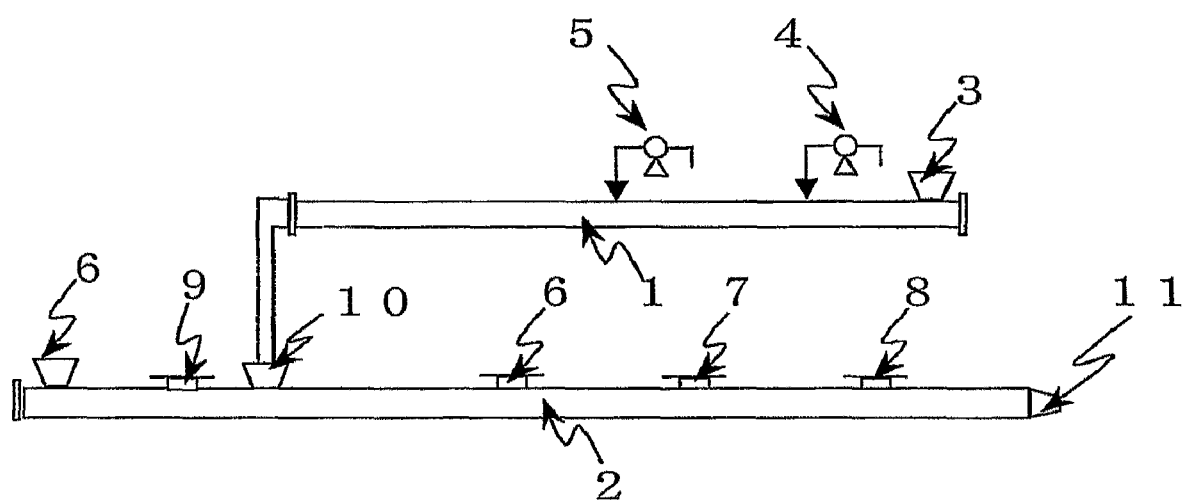
FIG. 4 is a schematic view of another extruder used in the present invention.

An olefinic thermoplastic elastomer was produced using the apparatus illustrated in FIG. 4, in which a first extruder and a second extruder are coupled together. The first extruder was a twin-screw extruder having the product name "TEX65XCT" manufactured by The Japan Steel Works Ltd., with a cylinder inner diameter of 69 mm and a ratio (L/D) between cylinder length and cylinder inner diameter of 31.5. Further, a water pipe for cooling was provided on the inner side of the cylinder, and a heater for controlling the temperature was provided on the outer side of the cylinder. The second extruder was a twin-screw extruder having the product name "TEX30α" manufactured by The Japan Steel Works Ltd., with a cylinder inner diameter of 32 mm and a ratio (L/D) between cylinder length and cylinder inner diameter of 52.5. Further, a water pipe for cooling was provided on the inner side of the cylinder, and a heater for controlling the temperature was provided on the outer side of the cylinder.

Example 5

EPDM-2 and PP-2 were continuously supplied, both by using a metered feeder, from a supply port (3) of the first extruder (1) at a supply rate of 25 kg/hr for the EPDM-2 and from a supply port (6) of the second extruder (1) at a supply rate of 16.75 kg/hr for the PP-2. Further, the mixed solvent was continuously supplied from a supply pump (4) of the first extruder at a supply rate of 5 kg/hr. The screw rotation speed of the first extruder (1) was set at 50 rpm, and the cylinder temperature was set at 130° C. At the first extruder (1), the EPDM-2 and mixed solvent were mixed and continuously supplied to the second extruder (2) via a supply port (10). The screw rotation speed of the second extruder (2) was set at 300 rpm, and the cylinder temperature was set at 180° C. At the second extruder (2), the mixed solvent was removed from vent (6), vent (7), vent (8) and vent (9) while the EPDM, PP and mixed solvent were kneaded. The kneaded product was cut by a pelletizer which was also provided in the second extruder to thereby obtain pellet-shaped olefinic thermoplastic elastomer. The temperature of the elastomer measured by a thermometer provided at position (11) of the second extruder is shown in Table 3.

Comparative Example 4

The same procedures were conducted as in Example 5, except that supply rate of the mixed solvent was changed to 2.5 kg/hr. The results are shown in Table 3.

Comparative Example 5

The same procedures were conducted as in Example 5, except that no mixed solvent was used. The results are shown in Table 3.

Example 6

The same procedures were conducted as in Example 5, except that PP-2 was changed to PP-3, and the supply rate was changed to 10.7 kg/hr. The results are shown in Table 3

Comparative Example 6

The same procedures were conducted as in Example 6, except that the supply rate of the mixed solvent was changed to 2.5 kg/hr. The results are shown in Table 3.

Comparative Example 7

The same procedures were conducted as in Example 6, except that no mixed solvent was used. The results are shown in Table 3.

TABLE 3

|  | Example 5 | Comparative Example 4 | Comparative Example 5 | Example 6 | Comparative Example 6 | Comparative Example 7 |
| --- | --- | --- | --- | --- | --- | --- |
| EPDM-2 (parts by weight) | 100 | 100 | 100 | 100 | 100 | 100 |
| Mixed solvent (parts by weight) | 20 | 10 | 0 | 20 | 10 | 0 |
| PP-2 (parts by weight) | 67 | 67 | 67 | 30 | 30 | 30 |
| Second extruder outlet temperature (° C.) | 232 | 235 | 238 | 264 | 269 | 273 |

The invention claimed is:

1. A method for producing an olefinic thermoplastic elastomer comprising mixing 100 parts by weight of an olefin copolymer rubber (A) obtained by polymerizing ethylene, an α-olefin having 3 to 20 carbon atoms and a non-conjugated polyene, and based on 100 parts by weight of the olefin copolymer rubber (A), 15 to 50 parts by weight of a volatile organic solvent (B) and 5 to 150 parts by weight of an olefin resin (C) to obtain a mixture, and removing from the mixture the volatile organic solvent (B) while kneading the mixture in an extruder, wherein the olefin resin (C) is a resin obtained by polymerization of ethylene and/or an α-olefin.

2. The method according to claim 1, wherein the olefin resin (C) is a propylene resin.

3. The method according to claim 1, wherein the mixture further comprises 1 to 300 parts by weight of a mineral oil softener (D).

4. The method according to claim 1, wherein 20 to 50 parts by weight of a volatile organic solvent is used.

5. The method according to claim 2, wherein the mixture further comprises 1 to 300 parts by weight of a mineral oil softener (D).

* * * * *